United States Patent
Van Duin et al.

(10) Patent No.: US 10,808,113 B2
(45) Date of Patent: Oct. 20, 2020

(54) RUBBER COMPOSITION

(71) Applicant: ARLANXEO NETHERLANDS B.V., Geleen (NL)

(72) Inventors: Martin Van Duin, Sittard (NL); Victor Fidel Quiroga Norambuena, Lanaken (BE); Maria Alvarez-Grima, Maastricht (NL); Gose Van Zandvoort, Herlen (NL)

(73) Assignee: Arlanxeo Netherlands B.V. (NL)

( * ) Notice: Subject to any disclaimer, the term of this patent is extended or adjusted under 35 U.S.C. 154(b) by 81 days.

(21) Appl. No.: 16/099,746

(22) PCT Filed: May 11, 2017

(86) PCT No.: PCT/EP2017/061251
§ 371 (c)(1),
(2) Date: Nov. 8, 2018

(87) PCT Pub. No.: WO2017/198521
PCT Pub. Date: Nov. 23, 2017

(65) Prior Publication Data
US 2019/0153206 A1 May 23, 2019

(30) Foreign Application Priority Data
May 20, 2016 (EP) .................................... 16170680

(51) Int. Cl.
*C08L 23/16* (2006.01)
*C09K 3/10* (2006.01)
*C08F 210/16* (2006.01)
*C08F 210/18* (2006.01)

(52) U.S. Cl.
CPC ............ *C08L 23/16* (2013.01); *C08F 210/16* (2013.01); *C08F 210/18* (2013.01); *C09K 3/10* (2013.01); *C08L 2205/03* (2013.01); *C09K 2200/0405* (2013.01); *C09K 2200/0607* (2013.01)

(58) Field of Classification Search
CPC .................................. C08L 23/16; C09K 3/10
USPC .......................................................... 524/476
See application file for complete search history.

(56) References Cited

U.S. PATENT DOCUMENTS

| | | | |
|---|---|---|---|
| 9,868,845 B2 * | 1/2018 | Beelen | C08L 23/16 |
| 10,150,859 B2 * | 12/2018 | Beelen | C08L 7/00 |
| 2015/0080522 A1 | 3/2015 | Tang et al. | |
| 2016/0152796 A1 * | 6/2016 | Beelen | C08K 5/01 |
| | | | 524/554 |
| 2017/0313868 A1 * | 11/2017 | Beelen | C08K 3/34 |

FOREIGN PATENT DOCUMENTS

| | | |
|---|---|---|
| JP | 2002047363 A | 2/2012 |
| WO | 2014059019 A2 | 4/2014 |

* cited by examiner

*Primary Examiner* — Deve V Hall
(74) *Attorney, Agent, or Firm* — Dentons Cohen & Grigsby P.C.

(57) ABSTRACT

A rubber composition, comprising i) an ethylene-α-olefin-non-conjugated-diene copolymer having—a Mooney viscosity ML (1+8) at 150° C. ≥85 MU and—an ethylene content ≤63 wt. %—the diene content is 4 to 8% by weight of the ethylene-a-olefin-non-conjugated-diene copolymer i), —the non-conjugated diene is a combination of 5-ethylidene-2-norbornene (ENB) and 5-vinylnorbornene (VNB), —the ethylene-α-olefin-non-conjugated-diene copolymer i) has an amount of VNB between 0.05 and 1 wt. %, and has a Mw of at least 400,000 g/mol and, ii) an extender oil of 10 to 40 phr based on the copolymer i) with the sum of the EPDM copolymer i) and the oil ii) amounting to at least 95 wt. % of the composition.

15 Claims, 1 Drawing Sheet

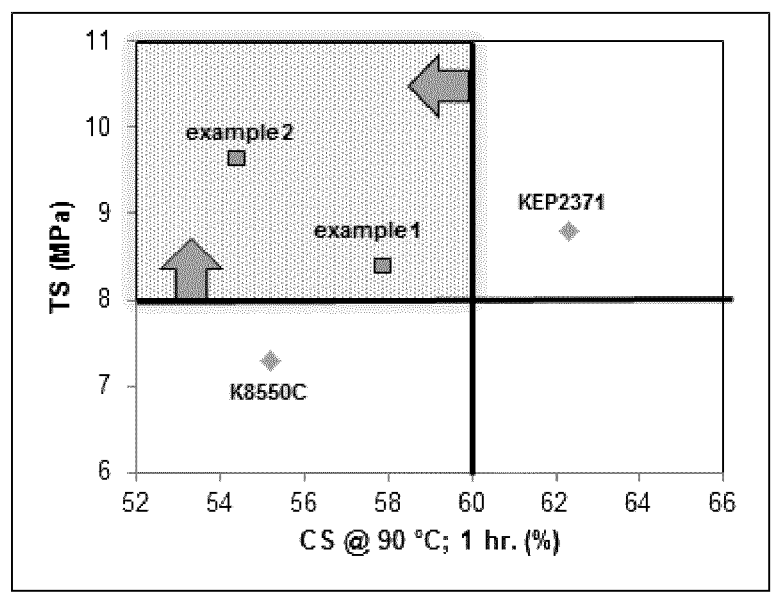

RUBBER COMPOSITION

The present invention relates to a certain rubber composition having a limited amount of extender oil, a process for its manufacturing, and its use for making highly loaded vulcanizates.

For automotive seals, building and construction window gaskets and other applications highly filled vulcanizates are preferred. In particular for automotive applications EPDM rubber compositions are desired that combine good elasticity with good mechanical properties. Highly filled rubber vulcanisates with good elasticity and mechanical properties pose a problem for todays industry.

Vulcanized rubber compounds are typically characterized in terms of mechanical performance and elasticity. In the context of this invention, tensile properties, such as tensile strength and elongation at break, and tear strength are critical mechanical properties; compression sets at elevated temperature and at or below room temperature are critical characteristics for elasticity.

Ethylene-α-olefin-diene elastomers, particularly ethylene-propylene-diene copolymers (EPDM) are recognized as excellent general-purpose elastomers that are useful in a wide variety of applications. EPDM is consisting of ethylene and propylene repeating units with a smaller amount of non-conjugated diene units to introduce unsaturation and, thus, facilitate crosslinking of the polymer chains. EPDM is a rubber without any unsaturation in the polymer backbone and, thus, has excellent resistance against oxygen, ozone, heat and UV-irradiation compared to polydiene rubbers. Consequently, EPDM rubber is used in outdoor and elevated temperature applications, such as automotive sealing systems, building and construction window gaskets, roof sheeting, coolant hoses and belts. EPDM rubber is typically compounded with fillers, such as reinforcing carbon blacks and inert white fillers, and with plasticizers, especially mineral oil. On the one hand, this results in practical EPDM compounds, which satisfy technical criteria as relevant for mixing, processing and final applications. On the other hand, this enables the production of relatively low-cost compounds with still satisfactory technical performance. However, increasing the total loading of an EPDM compound with very high levels of filler(s) and plasticizer(s) next to the base elastomer results in a deterioration of the mechanical and elastic properties, such as a decrease of the tensile strength, a decrease of the elongation at break and a decrease of the tear strength and an increase of the compression sets at various temperatures. The typical results of this eternal balancing act for EPDM application development are an excellent technical performance at a relatively low compound loading, a relatively poor performance at a very high compound loading or a compromise.

PRIOR ART

EP2818513 discloses EPDM copolymers with improved elasticity properties, whereby the exemplified rubber has a high amount of extender oil of 50 phr and a very low molecular weight distribution of smaller than 3.0. In addition, these EPDM polymers are designed for low-damping applications, such as engine mounts. This puts a limit to the total rubber compound loading, because high levels of filler(s) and plasticiser (oil) deteriorate the damping performance and, consequently, low filled compounds (<250 phr) are used.

In Joseph C. Salamone: "Polymeric Materials Encyclopedia Vol. 3 D-E", 23 Jul. 1996 CRC press, XP002761450 one can see that it is possible to measure Mooney at 150° C., which is needed to achieve reproducible and useful data on viscosity of very high molecular weight rubber polymers.

In EP2902412 also terpolymers are disclosed for elasticity purposes. The exemplified polymers do not contain any oil, which in case of high-molecular weight EPDM rubbers will prohibit efficient mixing of compounds, thus resulting in unacceptable long mixing times or two subsequent mixing cycles. In addition, only terpolymers with ENB are described, which will have insufficient levels of controlled long chain branching and, thus, will have high compound Mooney viscosities, resulting in low extrusion and moulding productivity.

In U.S. Pat. No. 9,139,727 rubber compositions for anti-vibration applications are disclosed. However, such rubber compositions consist of blends of two EPDMs, which requires multiple reactor technology. In addition, the need for low damping performance of such rubber applications requires low filled compounds (<250 phr).

In U.S. Pat. No. 5,229,478 high molecular weight EPDM elastomers based on hexadiene or ENB produced with a metallocene catalyst are exemplified. The drawback of such high molecular weight terpolymers is that they do not contain oil, which will prohibit efficient mixing of compounds of EPDM rubber. In addition, only terpolymers with hexadiene or ENB are described, which will have insufficient levels of long chain branching and, thus, will have high compound Mooney viscosities.

In JP2002-047363A oil-free terpolymers and quaterpolymers are mentioned having quite high ethylene contents. The drawback of such EPDMs is that the absence of extender oil puts a limit to the maximum molecular weight in view of efficient mixing and that high ethylene contents result in EPDMs with high crystallinity, which result in inferior elasticity at room-temperature and below.

Oil-free terpolymers are also mentioned in JP2002-047382, which again in case of very high molecular weight EPDMs will suffer from mixing limitations.

In U.S. Pat. No. 3,884,993 EPM and EPDM rubbers having improved processability are exemplified. However, these EP(D)M products are bimodal of composition, requiring multiple reactor technology for their production. These polymers are also oil-free, which severely limits mixing efficiency, and contain low levels of diene, which results in slow vulcanisation.

Other terpolymers are disclosed in JP371161 B2 having low Mooney viscosity and quite high oil contents. As far as the EPDM polymers are concerned, the very high oil levels makes them rather highly priced products.

An EPDM vulcanizate to be used in an automotive solid seal should typically have a compression set (22 hr compression at 90° C.; cooling for 3 hr in compressed state at room temperature and measurement after 1 hr relaxation at room temperature according to DVR VW 3307), below 60%. Furthermore, the tensile strength according to DIN ISO 37 shall be preferably higher than 8 MPa for test plaques prepared from the automotive solid seal compound.

Numerous commercial EPDM grades as mentioned in Table 1 are known for this purpose, but still can be improved in order to fulfill these stringent requirements in particular for automotive applications in particular for high loaded rubber vulcanizates.

TABLE 1

Characteristic of commercial EPDM products

| | brochure data | | | | | | |
|---|---|---|---|---|---|---|---|
| | Mooney viscosity | | | | chemical composition | | |
| EPDM product | ML (1 + 4) @ 125° C. (MU) | ML (1 + 8) @ 125° C. (MU) | ML (1 + 4) @ 150° C. (MU) | ML (1 + 8) @ 150° C. (MU) | ethylene content (wt. %) | ENB content (wt. %) | oil content (phr) |
| Esprene ® 5277F [1] | | | 81 | | 54 | 8.5 | |
| Royalene ® 515 [2] | | | 82 | | 56 | 9.5 | |
| KEP2371 [3] | | 115 | | | 70 | 7.0 | |
| Keltan ® 8550C [4] | 80 | | | | 48 | 5.5 | |
| Keltan ® 9950C [4] | | | | 60 | 44 | 9.0 | |
| Keltan ® 3973 [4] | 34 | | | | 66 | 9.0 | 30 |
| Keltan ® 9565Q [4] | | | | 67 | 62 | 5.5 | 50 |
| Keltan ® 5469 [4] | 52 | | | | 63 | 4.5 | 100 |

[1] Sumitomo Chemical; see http://www.sumitomo-chem.co.jp/polyolefin/03product/pdf/22esprene_epdm.pdf
[2] Lion Elastomers; see http://lionelastomers.com/main/royalene_royaledge
[3] Kumho Polychem; see http://www.kumhopolychem.co.kr/eng/product/epdm?seq=1
[4] Arlanxeo; see http://keltan.com/en/the-power-of-keltan/premium-quality/brochures/

Hence, the object of the present invention is to provide a rubber composition that shows improved properties, in particular good elasticity and good mechanical properties when used to make vulcanizates, in particular with a high total loading.

This object is achieved with a rubber composition, comprising i) an ethylene-α-olefin-non-conjugated-diene copolymer having
a Mooney viscosity ML (1+8) at 150° C.≥85 MU and an ethylene content ≤63 wt. %, preferably ≤60 wt. %,
the non-conjugated-diene content is 4 to 8% by weight of the ethylene-α-olefin-non-conjugated-diene copolymer i),
the non-conjugated diene is a combination of 5-ethylidene-2-norbornene (ENB) and 5-vinylnorbornene (VNB),
the ethylene-α-olefin-non-conjugated-diene copolymer i) has an amount of VNB between 0.05 and 1 wt. %, and has a Mw of at least 400,000 g/mol and, ii) an extender oil of 10 to 40 phr based on the copolymer i), with the sum of i) the EPDM copolymer and ii) the oil amounting to at least 95 wt. % of the composition.

Ethylene-α-olefin-Non-Conjugated-Diene Copolymer (i)

The preferred ethylene content, more precisely spoken the structural unit in the copolymer derived from the ethylene monomer is 63% by weight of the polymer or lower, preferably ≤60 wt. %. A more preferred ethylene content is from 355 to 63 wt. %, preferably from 55 to 60 wt. %.

Examples of the α-olefin of the ethylene-α-olefin-non-conjugated diene copolymer of the present invention are propylene, 1-butene, 1-pentene, 1-hexene, 4-methyl-1-pentene, 1-octene and 1-decene. Of these, propylene and 1-butene are preferred. Propylene is the most preferred.

Preferably, the diene content is 4 to 6% by weight of the ethylene-α-olefin-non-conjugated-diene copolymer.

Preferably the sum of ethylene, non-conjugated diene(s) and α-olefin is higher than 99 wt. %, in particular 100 wt. % of the monomers.

In a preferred embodiment the Mooney viscosity of the ethylene-α-olefin-non-conjugated-diene copolymer i) ML (1+8) at 150° C. is ≥95 MU, preferred ≥100 MU, in particular 100 to 200 MU.

The ethylene-α-olefin-non-conjugated-diene copolymer (i) preferably does have a weight average molecular weight (Mw) (measured by high-temperature gel permeation chromatography (GPC), using a calibration curve prepared using a standard ethylene-propylene copolymer) of from 400,000 to 700,000 g/mol.

Also preferred is the rubber composition of the present invention wherein the ethylene-α-olefin-non-conjugated diene copolymer i) has a molecular weight distribution, namely, weight average molecular weight/number average molecular weight (Mw/Mn), measured by high-temperature GPC in the range of 3.5 to 6.0.

Furthermore, the copolymer i) is preferably branched with a Δδ between 0 and 30, more preferred is a Δδ between 5 and 20, even more preferred is a Δδ between 5 and 15.

Δδ (expressed in degrees) is the difference between the phase angle δ at a frequency of 0.1 rad/s and the phase angle δ at a frequency of 100 rad/s, as determined by Dynamic Mechanical Spectroscopy (DMS) at 125° C. This quantity Δδ is a measure for the amount of long chain branched structures present in the polymer and has been introduced in H. C. Booij, Kautschuk+Gummi Kunststoffe, Vol. 44, No. 2, pages 128-130, which is incorporated herein by reference.

Such a Δδ value can in particular be achieved with the use of small amounts of VNB as diene between 0.1 and 0.75 wt. %.

Extender Oil (ii)

The optional "extender oil" ii) used in the present invention preferably means a petroleum softening agent conventionally used in the production of oil-extended rubber. Examples of the extender oil are paraffinic, naphthenic and aromatic extender oils obtained by purifying, and if necessary further processing, of high boiling fractions of petroleum. Wherein "phr" means parts in weight per hundred parts in rubber copolymer. These extender oils generally show a dynamic viscosity of from 5 to 35 mm$^2$/s at 100° C. Preferred processing oils are paraffinic ones. A suitable paraffinic oil is e.g. Sunpar® 2280, available from Sunoco, clear paraffinic oil like Conopure® 12P, available from ConocoPhillips, or white oil like ParaLux® 6001 available from Chevron Texaco. Oils made via a gas to liquid (GTL) process, like e.g. Risella® X 430 from Shell, are also preferred.

The rubber composition of the present invention consisting of at least 95 wt. % of the components i) and ii), preferably at least 98 wt. %, allows the balance to be used by auxiliary agents iii) as defined hereinafter.

Auxiliary Agents (iii)

Auxiliary agents are further ingredients in addition to the components i) an ii) of the present rubber composition, like antioxidants such as Irganox® 1076 from BASF, UV stabilizers, partitioning agents or processing aids like talc or metal salts, such as e.g. zinc stearate, magnesium stearate or calcium stearate, that will remain in the rubber after manufacturing.

Process

The present invention also refers to a process for manufacturing the rubber composition according to the present invention. The rubber composition can be manufactured by mixing the components i), optionally ii) and further auxiliary agents iii).

Furthermore, a process for producing the ethylene-α-olefin-non-conjugated-diene copolymer (i) without or with the extender oil ii) of the present invention is not particularly limited. The product can be produced by a solution, slurry or gas phase polymerization process, using e.g. a conventional vanadium-based catalyst, a metallocene catalyst or a post-metallocene catalyst. Suitable processes and catalysts are known in the literature.

The rubber composition of the present invention can be produced by a process wherein the extender oil (ii) is blended with the ethylene-α-olefin-non-conjugated-diene copolymer (i) during the production step thereof. The addition preferably takes place after the polymerization reactor, but before the removal of volatiles, for instance before a steam stripper or a dry finishing extruder. More specifically, it is produced by a process wherein the extender oil (ii) is blended with the ethylene-α-olefin-non-conjugated-diene copolymer (i) which is dissolved or suspended in the reaction media coming from the polymerization reactor.

The present invention also relates to a process for forming a vulcanized rubber article, comprising the steps of:
mixing:
- a) the rubber composition according to the present invention,
- b) a vulcanization package,
- c) one or more fillers,
- d) one or more plasticizers and
- e) optionally, other rubber additives to form a vulcanizable rubber composition, wherein said mixture having a total compound loading of at least 250 phr, in particular at least 350 phr, preferably at least 450 phr and even more preferably of at least 550 phr and processing such a mixture to form the final shape of an extruded or moulded article and vulcanizing said vulcanizable rubber composition.

The total compound loading is defined as the sum of all ingredients in the vulcanizable rubber composition or its vulcanizate, i.e. the ingredients of the copolymer rubber composition of the present invention a), the vulcanization package b), the filler(s) c), the plasticizer(s) d) and other additive(s) e) in parts in weight per hundred parts in weight of rubber (phr).

Such a process preferably comprises, for example, the steps of (i) kneading the rubber composition of the present invention with fillers, plasticizers, a vulcanizing package, and, if necessary, the above-mentioned other ingredients, in a conventional kneading machine, such as an open roll mill, an internal mixer, a kneader or an extruder to obtain a mixed compound, and (ii) vulcanizing (cross-linking, curing) the resulting kneaded compound under heating. Such a mixing process can be done in one or more steps, as known to a man skilled in the art.

Vulcanised compounds of such an rubber composition according to the present invention enable vulcanizates with high compound loadings, which still combine good mechanical properties with good elasticity.

Vulcanization Package b)

Examples of the vulcanizing agent are sulfur; sulfur chloride; sulfur dichloride; 4,4'-dithiodimorpholine; morpholine disulfide; alkylphenol disulfide; tetramethylthiuram disulfide (TMTD); tertaethylthiuram disulfide (TETD); selenium dimethyldithiocarbamate; and organic peroxides, such as dicumyl peroxide (DCP), 2,5-di(t-butylperoxy)-2,5-dimethylhexane (DTBPH), di(t-butylperoxyisopropyl)benzene (DTBPIB), 2,5-di(benzoylperoxy)-2,5-dimethylhexane, 2,5-(t-butylperoxy)-2,5-dimethyl-3-hexyne (DTBPHY), di-t-butylperoxide and di-t-butylperoxide-3,3,5-trimethylcyclohexane (DTBTCH) or mixtures of these peroxides. Of these, preferred are sulfur, TMTD, TETD, DCP, DTBPH, DTBPIB, DTBPHY and DTBTCH.

In case of sulfur vulcanization, sulfur is preferably used in an amount of 0.1 to 10 phr, preferably from 0.5 to 5 phr or even more preferably 0.5 to 2 phr.

In case of peroxide cure, the organic peroxide is used in an amount of usually from 0.1 to 15 phr and preferably from 0.5 to 5 phr.

Sulfur as vulcanizing agent may be used, if necessary, in combination with one or more vulcanization accelerators and one or more vulcanization activators. Examples of the vulcanization accelerators are N-cyclohexyl-2-benzothiazole-sufenamide, N-oxydiethylene-2-benzothiazole-sulfenamide, N, N-diisopropyl-2-benzothiazole-sulfen-amide, 2-mercaptobenzothiazole, 2-(2,4-dinitrophenyl)mercaptobenzothiazole, 2-(2,6-diethyl-4-morpholinothio)benzothiazole, dibenzothiazyl-disulfide, diphenylguanidine, triphenylguanidine, di-o-tolylguanidine, o-tolyl-bi-guanide, diphenylguanidine-phthalate, an acetaldehyde-aniline reaction product, a butylaldehyde-aniline condensate, hexamethylenetetramine, acetaldehyde ammonia, 2-mercaptoimidazoline, thiocarbaniride, diethylthiourea, dibutylthiourea, trimethylthiourea, di-o-tolylthiourea, tetramethylthiuram monosulfide, TMTD, TETD, terabutylthiuram disulfide, dipentamethylenethiuram tetrasulfide, zinc dimethyldithiocarbamate, zinc diethyl-thiocarbamate, zinc di-n-butylthiocarbamate, zinc ethylphenyldithiocarbamate, zinc butylphenyldithiocarbamate, sodium dimethyldithlocarbamate, selenium dimethyldithiocarbamate, tellurium diethyldithiocarbamate, zinc dibutylxanthate and ethylenethiourea. The vulcanization accelerators, if used, are used preferably in an amount of from 0.1 to 10 parts by weight, and even more preferred from 0.2 to 5 parts by weight and in particular between 0.25 and 2 phr, per 100 parts by weight of the ethylene-α-olefin-non-conjugated-diene (i).

Examples of the vulcanization activator are metal oxides, such as magnesium oxide and zinc oxide, and stearic acid or the reaction product like zinc stearate. Of these, preferred is zinc oxide combined with stearic acid. The vulcanization activators are used usually in amounts from 0.5 to 10 phr based on the EPDM copolymer (i), preferably in amounts from 0.5 to 5 phr.

When peroxide or a mixture of peroxides is used as the vulcanizing agent, peroxide coagents may be used. Examples of such peroxide coagent are cyanurate compounds, such as triallyl cyanurate and triallylisocyanurate, (meth)acrylate compounds, such as trimethylolpropane trimethacrylate and ethyleneglyclol dimethacrylate, zinc dimethacrylate and zinc diacrylate, divinylbenzene, p-quinonedioxime, m-phenylene dimaleimide, (high vinyl) polybutadiene, and combinations thereof. Preferably, 0.1 to 5 phr of the peroxide coagents may be used. Even more preferred, 0.25 to 2.5 phr of the peroxide coagent may be used. When peroxides are used as the vulcanizing agent in addition, sulphur (elementary or as part of sulphur accelerators or sulphur donors) can be used to obtain so-called hybrid curing systems. These curing systems combine high heat resistant properties, typical for peroxide cure, with very good ultimate properties, such as tensile and tear, as well as excellent dynamic and fatigue properties typically associated with sulfur vulcanization systems. Applied dosing levels of sulfur are preferably from 0.05 to 1.0 phr, preferably from 0.2 to 0.5 phr.

Fillers c)

Preferably the filler is used in an amount of 20 to 500 phr in the process of the present invention. Preferred fillers are carbon black and/or inorganic fillers such as silica, calcium carbonate, talc and clay, which are conventionally used for rubber. The type of carbon black is classified according ASTM D-1765 for its particle size (BET in $m^2/g$) and structure (DBP adsorption in $cm^3/100$ g). Preferably carbon black fillers are used with a BET number in from 5 to 150, and DBP numbers in from 30 to 140. In the industry these type of carbon blacks are often designated to by abbreviations, such as MT, SRF, GPF, FEF, HAF, ISAF, SAF. The inorganic fillers may be surface treated with e.g. suitable silanes. Combinations of two or more of such fillers may be used. Most preferably used are carbon black and/or silanized silica.

Plasticizers d)

As plasticizer the same as the extender oil ii) of the present invention can be used. Furthermore as plasticizer lubricating oil, paraffin, liquid paraffin, petroleum asphalt, vaseline, low molecular weight polyisobutylene or polybutylene, liquid EPDM or EPM, coal tar pitch, castor oil, linseed oil, bee's wax, atactic polypropylene and cumarone indene resin can be mentioned. Preferred is the addition of 20 to 250 phr of a paraffinic process oil. This paraffinic oil may be made according to a GTL process.

Other Rubber Additives e)

As other rubber additives e) the same as the auxiliary agents iii) mentioned above can be used. The vulcanizable rubber composition may in addition also contain other additives, such as dessicants (e.g. calcium oxide), tackyfiers (e.g., resin), bonding agents, pigments, process aids (e.g. factice, fatty acids, stearates, poly- or diethylene glycol), antioxidants, heat stabilisers (e.g. poly-2,2,4-trimethyl-1,2-dihydroquinoline or zinc 2-mercaptobenzimidazole), UV stabilisers, anti-ozonants, blowing agents, as well as mould release additives.

The present invention also relates to a vulcanized rubber article made from the vulcanizable rubber composition of the present invention. Examples of such vulcanized rubber articles are an automotive solid seal, a building and construction window gasket, a thermoplastic vulcanizate, an engine mount, and highly filled compounds for low hardness applications and injection moulding applications.

EXAMPLES

Preparation of EPDM Copolymers Examples 1 and 2.

The polymerization was carried out in a solution polymerization reactor with a volume of 3 L. The hexanes, ethylene, propylene, dienes and hydrogen feed streams were purified by contacting with various absorption media to remove catalyst-killing impurities, such as water, oxygen and polar compounds, as is known to those skilled in the art. The process is continuous in all feed streams. Pre-mixed hexanes, propylene, ethylene, dienes, hydrogen, tri-octyl aluminium and butylated hydroxytoluene were pre-cooled before being fed to the reactor. A solution, containing the catalyst compound 19 as disclosed in WO2005/090418 and triphenylcarbenium tetrakisperfluorophenylborate, was fed separately to the reactor. The hydrogen content was adjusted to achieve the desired polymer Mooney as given in Table 2. The polymer solution was continuously removed through a discharge line, where a solution of Irganox® 1076 in iso-propanol was added, optionally a paraffinic extender oil was added to the polymer solution, and, finally, the solution of polymer (and oil) is worked up by continuously steam stripping. The final EPDM sample was obtained after batchwise drying of the polymer on a 2-roll mill.

The EPDM polymers examples 1 and 2 were analyzed using FT-IR for chemical composition, according to ASTM D 3900 and D 6047, oil content via extraction with acetone, Mooney viscosity ML(1+8) @ 150° C. according to ISO 289, the degree of branching as indicated by the parameter as explained in H. C. Booij, Kautsch. Gummi Kunstst. 44 (1991) 128 and GPC for the molecular weights Mw and Mn and molecular weight distribution MWD. Table 2 compares the polymer characteristics of EPDM examples 1 and 2 with those of the commercial references KEP2371 and K8550C. The propylene wt. % content is not given in Table 2, but can be calculated for the given grades to be 100% minus the sum of ethylene, ENB and VNB contents. For the commercial grades in Table 2 the ethylene and ENB data are taken from the brochures and the VNB content was measured according to ASTM D 6047.

Table 2 compares the polymer characteristics of EPDM examples 1 and 2 with those of the commercial grades KEP2371 and K8550C.

TABLE 2

| EPDM | | K8550C | KEP2371 | example 1 | example 2 |
|---|---|---|---|---|---|
| ethylene | (wt. %) | 48 [1] | 70 [2] | 56.5 | 60.4 |
| ENB | (wt. %) | 5.5 [1] | 7 [2] | 4.9 | 4.8 |
| VNB | (wt. %) | 0.26 | 0.0 | 0.23 | 0.22 |
| oil | (phr) | 0 [1] | 0 [2] | 0 | 12.6 |
| ML (1 + 8) @ 150° C. | (MU) | 52.4 | 88.2 | 86.7 | 104 [3] |
| Δδ | (°) | 18.2 | 14 | 11.0 | 14.8 |
| Mn | kg/mol | 89 | 89 | 95 | 139 |
| Mw | kg/mol | 310 | 370 | 390 | 510 |
| Mw/Mn | | 3.5 | 4.2 | 4.1 | 3.7 |

[1] data from Arlanxeo Performance Elastomers: see http://keltan.com/en/the-power-of-keltan/premium-quality/brochures/
[2] Kumho Polychem; see http://www.kumhopolychem.co.kr/eng/product/epdm?seq = 1
[3] ML (1 + 8) @ 150° C. of product composed of EPDM with ML (1 + 8) @ 150° of 104 and 12.6 phr of oil isC 87.8 MU TABLE 1a Overview of various commercial EPDM products and inventive grades

| | Mooney viscosity | | | | | chemical composition | | |
|---|---|---|---|---|---|---|---|---|
| | brochure data | | | | calculated [6] | brochure data | | |
| EPDM product | ML (1 + 4) @ 125° C. (MU) | ML (1 + 8) @ 125° C. (MU) | ML (1 + 4) @ 150° C. (MU) | ML (1 + 8) @ 150° C. (MU) | ML (1 + 8) @ 150° C. polymer (MU) | ethylene content (wt. %) | ENB content (wt. %) | oil content (phr) |
| Esprene ® 5277F [1] | | | 81 | | 74 | 54 | 8.5 | |
| Royalene ® 515 [2] | | | 82 | | 75 | 56 | 9.5 | |
| KEP2371 [3] | | 115 | | | 88 | 70 | 7.0 | |
| Keltan ® 8550C [4] | 80 | | | | 52 | 48 | 5.5 | |
| Keltan ® 9950C [4] | | | | 60 | 60 | 44 | 9.0 | |
| Keltan ® 3973 [4] | 34 | | | | 52 | 66 | 9.0 | 30 |
| Keltan ® 9565Q [4] | | | | 67 | 124 | 62 | 5.5 | 50 |
| Keltan ® 5469 [4] | 52 | | | | 144 | 63 | 4.5 | 100 |
| example 1 [5] | | | | 88 | 88 | 58 | 5.0 | |
| example 2 [5] | | | | 88 | 105 | 56 | 5.5 | 15 |

[1] Sumitomo Chemical; see http://www.sumitomo-chem.co.jp/polyolefin/03product/pdf/22esprene_epdm.pdf
[2] Lion Elastomers; see http://lionelastomers.com/main/royalene_royaledge
[3] Kumho Polychem; see http://www.kumhopolychem.co.kr/eng/product/epdm?seq=1
[4] Arlanxeo; see http://keltan.com/en/the-power-of-keltan/premium-quality/brochures/
[5] this invention
[6] to allow a comparison, the Mooney data to the extent data at 150° C. were not available or not measured have been converted to ML (1 + 8) @ 150° C. by using correlations based on experimental data for ML (1 + 4) @ 125° C., ML (1 + 8) @ 125° C., ML (1 + 4) @ 150° C. and ML (1 + 8) @ 150° C. for a variety of EPDM polymers; a correction for the presence of oil was made for ML (1 + 4) @ 125° C. with 1.5 MU/phr oil which was based on ML (1 + 4) @ 125° C. data for oil-extended EPDM polymers before and after acetone extraction of the oil.

Preparation of a Vulcanizable Rubber Composition
Ingredients:
Various vulcanizable rubber compositions based on four different EPDM products without or with 15 phr extender oil (cf. Table 2) and in roughly 400, 500 and 600 phr compounds were prepared (Table 3). The ingredients used for the various compound evaluations are listed in Table 4.

TABLE 3

EPDM compund compositions used for evaluation different EPDM products without oil or with 15 phr of oil in 400, 500 and 600 phr compounds.

| | composition based on A), B) or C) | | | composition based on D) | | |
|---|---|---|---|---|---|---|
| ingredient | 400 phr | 500 phr | 600 phr | 400 phr | 500 phr | 600 phr |
| non-oil EPDM A), B) or C) | 100 | 100 | 100 | 0 | 0 | 0 |
| EPDM D) | 0 | 0 | 0 | 115 | 115 | 115 |
| Corax ® N-550 | 120 | 160 | 200 | 120 | 160 | 200 |
| Whiting BSH | 80 | 100 | 120 | 80 | 100 | 120 |
| Sunpar ® 2280 | 80 | 115 | 150 | 65 | 100 | 135 |
| ZnO aktiv ® | 5 | 5 | 5 | 5 | 5 | 5 |
| Edenor ® C 18 98-100 | 1 | 1 | 1 | 1 | 1 | 1 |
| PEG (4000) | 2 | 2 | 2 | 2 | 2 | 2 |
| milled sulfur 90/95 | 0.3 | 0.3 | 0.3 | 0.3 | 0.3 | 0.3 |
| Rhenogran ® CaO-80 | 6.9 | 6.9 | 6.9 | 6.9 | 6.9 | 6.9 |
| Rhenogran ® TBBS-80 | 0.5 | 0.5 | 0.5 | 0.5 | 0.5 | 0.5 |
| Rhenogran ® MBTS-80 | 1.3 | 1.3 | 1.3 | 1.3 | 1.3 | 1.3 |
| Rhenogran ® ZBEC-70 | 2 | 2 | 2 | 2 | 2 | 2 |
| Rhenogran ® ZDBP-50 | 2 | 2 | 2 | 2 | 2 | 2 |
| Rhenogran ® ZAT-70 | 0.6 | 0.6 | 0.6 | 0.6 | 0.6 | 0.6 |
| Rhenogran ® S-80 | 0.75 | 0.75 | 0.75 | 0.75 | 0.75 | 0.75 |
| Rhenogran ® DTDC-80 | 1 | 1 | 1 | 1 | 1 | 1 |
| Vulkalent ® E/C | 0.5 | 0.5 | 0.5 | 0.5 | 0.5 | 0.5 |
| total | 403.85 | 498.85 | 593.85 | 403.85 | 498.85 | 593.85 |

A) Kumho KEP2371;
B) Arlanxeo Keltan ® 8550C;
C) Example 1;
D) Example 2

TABLE 4

Overview of compound ingredients used

| ingredient | chemical composition | supplier |
|---|---|---|
| Corax ® N-550 | carbon black | Evonik |
| Whiting BSH | calcium carbonate | Omya |
| Sunpar ® 2280 | paraphinic oil | Sunoco |
| ZnO aktiv ® | zinc oxide | Rhein Chemie Additives |
| Edenor ® C 18 98-100 | stearic acid | Emery Oleochemicals |
| PEG 4000 | polyethylene glycol | Merck |
| milled sulfur 90/95 | sulfur | VWR International |
| Rhenogran ® CaO-80 | 80% calcium oxide on carrier | Rhein Chemie Additives |
| Rhenogran ® TBBS-80 | 80% N-tert.-butyl-2-benzothiazyl sulfenamide on carrier | Rhein Chemie Additives |
| Rhenogran ® MBTS-80 | 80% dibenzothiazole disulfide on carrier | Rhein Chemie Additives |
| Rhenogran ® ZBEC-70 | 70% zinc-dibenzyl-dithiocarbamate on carrier | Rhein Chemie Additives |
| Rhenogran ® ZDBP-50 | 50% zinc dialkyldithiophosphate on carrier | Rhein Chemie Additives |
| Rhenogran ® ZAT-70 | 70% zinc amine dithiophosphate on carrier | Rhein Chemie Additives |
| Rhenogran ® S-80 | 80% sulfur on carrier | Rhein Chemie Additives |
| Rhenogran ® DTDC-80 | 80% caprolactam disulfide | Rhein Chemie Additives |
| Vulkalent ® E/C | N-phenyl-N-(trichloromethylsulfenyl)-benzene sulphonamide | Rhein Chemie Additives |

Experimental Part and Test Methods

All compounds were prepared on a laboratory internal mixer (GK1,5 E1 from Harburg-Freudenberger Maschinenbau GmbH; ram pressure 7 bar, 45 rpm, 70% degree of filling and total mixing time 4 min). Chemicals of the vulcanization system were added on an open mill (200 mm diameter of the rolls; 20 rpm, 40° C. roll temperature and friction 1, 22). Test specimens have been prepared for all compounds by curing test plates of 2 mm and 6 mm thickness at 180° C. to a time equivalent to 1.1 and 1.25 times t90 (t90 is the time to reach 90% of maximum torque during the rheometer measurement).

Various mechanical and elastic properties were measured in accordance with the test methods listed in Table 5.

Tables 6, 7 and 8 show the compound properties and the mechanical and elastic properties of the corresponding vulcanizates, based on compound formulations with about 600, 500 and 400 phr, respectively, with the four EPDMs investigated (cf. Tables 2 and 3).

The data from Table 6 are next compared with typical requirements for automotive, solid seals of i) tensile strength >8 MPa for test plaques combined with ii) the compression set according to DVR VW 3307 (22 hr. compression at 90° C., cooling for 3 hrs. in compressed state at room temperature and measurement after 1 hr. relaxation at room temperature) below 60%. K8550C does fulfill the compression set requirement CS 90° C.; 1 hr, but not the tensile strength requirement. KEP2731 does fulfill the tensile strength requirement, but not the compression set CS 90° C.; 1 hr

TABLE 5

| Test methods. | | | | |
|---|---|---|---|---|
| method | standard | characteristic | abbreviation | unit |
| compound | | | | |
| Mooney viscosity | DIN 53523-3 | Mooney viscosity (1 + 4) @ 100° C. | compound ML | (MU) |
| Mooney scorch | DIN 53523-4 | scorch time for 5% rise of torque versus minimum torque @ 125° C. | t5s | (sec.) |
| rheometry | DIN 53529 | torque difference MH-ML @ 180° C. | DS | (dNm) |
| | | time to 1 dNm rise above minimum torque @ 180° C. | ts2 | (sec.) |
| | | time to 90% of maximum torque @ 180° C. | t90 | (sec.) |
| vulcanisate | | | | |
| hardness | DIN ISO 7619-1 | hardness | Hh | (Sh A) |
| tensile test | DIN ISO 37 | modulus at 100% elongation | M100% | (MPa) |
| | | modulus at 300% elongation | M300% | (MPa) |
| | | elongation at break | eab | (%) |
| | | tensile strength | TS | (MPa) |
| Delft tear test | ISO 34-2 | tear resistance | tear | (N/mm) |
| compression set test | DIN ISO 815 | compression set for 24 hr @ 25° C. | CS @ −25° C. | (%) |
| | | compression set for 24 hr @ 100° C. | CS @ 100° C. | (%) |
| | | compression set for 24 hr @ 70° C. | CS @ 70° C. | (%) |
| | | compression set for 24 hr @ 23° C. | CS @ 23° C. | (%) |
| compression set test | DVR VW-3307 | compression set for 22 hr @ 90° C.; storage in clamps 3 hr. @ 23° C.; 5 sec. relaxation | CS @ 90° C.; 5 sec. | (%) |
| | | compression set for 22 hr @ 90° C.; storage in clamps 3 hr. @ 23° C.; 1 hr. relaxation | CS @ 90° C.; 1 hr. | (%) |
| | | compression set for 72 hr @ 23° C.; 5 sec. relaxation | CS @ 23° C.; 5 sec. | (%) |
| | | compression set for 72 hr @ 23° C.; 1 hr. relaxation | CS @ 23° C.; 1 hr | (%) | requirement. The two EPDM examples according to the present invention fulfill both the tensile strength and compression set CS 90° C.; 1 hr requirements in this 600 phr compound. In FIG. 1 the tensile strength in MPa is plotted vs the compression set CS 90° C.; 1 hr in %, and the typical DVR VW 3307 specifications (top left quadrant) are given. For the vulcanizates based on examples 1 and 2 as of the present invention it can be seen that they fulfill the strong requirements of both a very high tensile strength of larger than 8 MPa and a compression set CS 90° C.; 1 hr below 60% for a total loading of about 600 phr. These properties are not achievable by the vulcanizates based on the respective commercial EPDM grades available for such purpose.

TABLE 6

Properties of compounds and vulcanizate for 593.85 phr compound formulation

| EPDM | | K8550C | KEP2371 | example 1 | example 2 |
|---|---|---|---|---|---|
| compound | | | | | |
| compound ML | (MU) | 49.0 | 54.9 | 50.6 | 67.0 |
| t5s | (sec.) | 654 | 527 | 682 | 616 |
| ΔS | (dNm) | 11.9 | 11.9 | 10.99 | 12.0 |
| ts2 | (sec.) | 53 | 47 | 53 | 50 |
| t90 | (sec.) | 165 | 140 | 156 | 159 |
| vulcanisate | | | | | |
| Hh | (Sh A) | 67.9 | 69.3 | 65.0 | 66.0 |
| M100% | (MPa) | 3.2 | 3.7 | 3.2 | 3.3 |
| M300% | (MPa) | — | — | 8.1 | 9.3 |
| eab | (%) | 282 | 279 | 312 | 313 |
| TS | (MPa) | 7.3 | 8.8 | 8.4 | 9.6 |
| tear | (N/mm) | 27.5 | 32.3 | 32.2 | 32.5 |
| CS @ -25° C. | (%) | 64.9 | 91.6 | 86.9 | 91.4 |
| CS @ 100° C. | (%) | 30.2 | 29.1 | 34.5 | 31.1 |
| CS @ 70° C. | (%) | 9.4 | 11.6 | 10.7 | 12.7 |
| CS @ 23° C. | (%) | 4.6 | 11.5 | 6.2 | 7.8 |
| CS @ 90° C.; 5 sec. | (%) | 63.5 | 70.2 | 61.8 | 59.9 |
| CS @ 90° C.; 1 hr. | (%) | 55.2 | 62.3 | 57.9 | 54.4 |
| CS @ 23° C.; 5 sec. | (%) | 20.9 | 28.6 | 22.0 | 20.1 |
| CS @ 23° C.; 1 hr | (%) | 12.2 | 15.9 | 12.8 | 10.1 |

In a similar way, the two examples of the present invention combine a tensile strength larger than 8 MPa with a compression set at 23° C. according to DIN ISO 815 below 10% in the 600 phr compounds, whereas the commercial EPDM products do not.

For the 500 phr compound formulations (Table 7) only the two examples of the present invention combine a tensile strength larger than 10 MPa with a compression set CS 90° C.; 1 hr below 53% and a compression set at 23° C. according to DIN ISO 815 below 8%, whereas the commercial EPDM products do not. Finally, for the 400 phr compound formulations (Table 8) only the two examples of the present invention combine a tensile strength larger than 11 MPa with a compression set at 23° C. according to DIN ISO 815 below 8%.

TABLE 7

Properties of compounds and vulcanisate for 498.85 phr compound formulation.

| EPDM | | K8550C | KEP2371 | example 1 | example 2 |
|---|---|---|---|---|---|
| compound | | | | | |
| compound ML | (MU) | 53.4 | 63.0 | 60.0 | 75.7 |
| t5s | (sec.) | 638 | 495 | 623 | 548 |
| ΔS | (dNm) | 13.9 | 13.8 | 13.63 | 14.4 |
| ts2 | (sec.) | 50 | 44 | 49 | 46 |
| t90 | (sec.) | 159 | 133 | 148 | 149 |
| vulcanisate | | | | | |
| Hh | (Sh A) | 65.6 | 68.5 | 66.0 | 65.9 |
| M100% | (MPa) | 3.4 | 4 | 3.4 | 3.4 |
| M300% | (MPa) | 8.7 | 10.4 | 9.7 | 10.4 |
| eab | (%) | 332 | 325 | 339 | 349 |
| TS | (MPa) | 9.3 | 10.8 | 10.6 | 11.6 |
| tear | (N/mm) | 37.7 | 35.3 | 36 | 38.9 |
| CS @ -25° C. | (%) | 55.7 | 93.5 | 82.5 | 92.4 |
| CS @ 100° C. | (%) | 28.5 | 26.1 | 30.0 | 27.4 |
| CS @ 70° C. | (%) | 8.6 | 11.7 | 10.0 | 11.2 |
| CS @ 23° C. | (%) | 4.7 | 10.3 | 6.3 | 6.6 |
| CS @ 90° C.; 5 sec. | (%) | 54.4 | 62.9 | 52.9 | 54.0 |
| CS @ 90° C.; 1 hr. | (%) | 49.5 | 53.7 | 49.7 | 46.4 |
| CS @ 23° C.; 5 sec. | (%) | 18.9 | 23.0 | 19.5 | 20.4 |
| CS @ 23° C.; 1 hr | (%) | 11.4 | 12.7 | 10.4 | 12.2 |

TABLE 8

Properties of compounds and vulcanisate for 403.85 phr compound formulation.

| EPDM | | K8550C | KEP2371 | example 1 | example 2 |
|---|---|---|---|---|---|
| compound | | | | | |
| compound ML | (MU) | 61.7 | 72.7 | 68.3 | 89.6 |
| t5s | (sec.) | 622 | 490 | 627 | 530 |
| ΔS | (dNm) | 16.7 | 16.2 | 16.31 | 17.8 |
| ts2 | (sec.) | 47 | 42 | 46 | 43 |
| t90 | (sec.) | 153 | 124 | 153 | 144 |
| vulcanisate | | | | | |
| Hh | (Sh A) | 66.8 | 68.4 | 65.2 | 65.5 |
| M100cY0 | (MPa) | 3.2 | 3.6 | 3.3 | 3.4 |
| M300% | (MPa) | 9 | 10.8 | 10.4 | 11.6 |
| eab | (%) | 367 | 370 | 368 | 383 |
| TS | (MPa) | 10.5 | 12.4 | 12.3 | 14.2 |
| tear | (N/mm) | 35.4 | 40.3 | 37.9 | 40.4 |
| CS @ -25° C. | (%) | 49.7 | 92.6 | 80.9 | 89.8 |
| CS @ 100° C. | (%) | 25.8 | 24.4 | 27.0 | 23.8 |
| CS @ 70° C. | (%) | 8.1 | 11.4 | 9.5 | 8.9 |
| CS @ 23° C. | (%) | 5.1 | 10.3 | 5.8 | 6.4 |

The invention claimed is:

1. A rubber composition comprising:
   i) an ethylene-α-olefin-non-conjugated-diene copolymer having:
      a Mooney viscosity ML (1+8) at 150° C. ≥85 MU;
      an ethylene content ≤63 wt. %;
      a diene content of 4 to 8% by weight, wherein the non-conjugated diene is a combination of 5-ethylidene-2-norbornene (ENB) and 5-vinylnorbornene (VNB);
      an amount of VNB of 0.05 to 1 wt. %; and
      a $M_w$ of at least 400,000 g/mol; and
   ii) 10 to 40 phr of an extender oil, based on the copolymer i);
   wherein a sum of the copolymer i) and the oil ii) is at least 95 wt. % of the composition.

2. The rubber composition according to claim 1, wherein the Mooney viscosity ML (1+8) at 150° C. is 85 to 150 MU.

3. The rubber composition according to claim 1, wherein the ethylene content is 55 to 63 wt. %.

4. The rubber composition according to claim 1, wherein the ethylene content is ≤60 wt. %.

5. The rubber composition according to claim 1, wherein the ethylene content is 55 to 60 wt. %.

6. The rubber composition according to claim 1, wherein the ethylene-α-olefin-non-conjugated-diene copolymer i) has a molecular weight distribution (MWD=$M_w/M_n$) of 3.5 to 6.0.

7. The rubber composition according to claim 1, wherein the ethylene-α-olefin-non-conjugated-diene copolymer i) has a Δδ of 0 to 30.

8. The rubber composition according to claim 1, wherein the diene content is 4 to 6% by weight of the ethylene-α-olefin-non-conjugated-diene copolymer i).

9. The rubber composition according to claim 1, wherein the amount of VNB is 0.1 to 0.75 wt. %.

10. The rubber composition according to claim 1, wherein the α-olefin of the ethylene-α-olefin-non-conjugated-diene copolymer i) is selected from the group consisting of propylene, 1-butene, 1 pentene, 1-hexene, 4-methyl-1-pentene, 1-octene and 1-decene.

11. The rubber composition according to claim 1, wherein the extender oil ii) is selected from the group consisting of paraffinic, naphthenic and aromatic extender oils obtained by purifying high boiling fractions of petroleum.

12. The rubber composition according to claim 1, wherein:
the Mooney viscosity ML (1+8) at 150° C. is 85 to 150 MU;
the ethylene content is 55 to 60 wt. %;
the ethylene-α-olefin-non-conjugated-diene copolymer i) has a molecular weight distribution (MWD=$M_w/M_n$) of 3.5 to 6.0;
the ethylene-α-olefin-non-conjugated-diene copolymer i) has a Δδ of 0 to 30;
the diene content is 4 to 6% by weight; and
the amount of VNB is 0.1 to 0.75 wt. %.

13. The rubber composition according to claim 12, wherein:
the Δδ is 5 to 20;
the ethylene, non-conjugated diene, and α-olefin comprise greater than 99 wt. % of the monomers of the ethylene-α-olefin-non-conjugated-diene copolymer;
the α-olefin is selected from the group consisting of propylene, 1-butene, 1-pentene, 1-hexene, 4-methyl-1-pentene, 1-octene and 1-decene; and
the extender oil ii) is selected from the group consisting of paraffinic, naphthenic, and aromatic extender oils obtained by purifying high boiling fractions of petroleum.

14. The rubber composition according to claim 13, wherein:
the Δδ is 5 to 15;
the α-olefin is at least one of propylene and 1-butene;
the ethylene, non-conjugated diene, and α-olefin comprise 100 wt. % of the monomers of the ethylene-α-olefin-non-conjugated-diene copolymer;
the extender oil ii) is paraffinic oil;
the $M_w$ is 400,000 g/mol to 700,000 g/mol; and
the sum of the copolymer i) and the oil ii) is at least 98 wt. % of the composition.

15. A process for forming a vulcanized rubber article comprising:
mixing:
a) the rubber composition according to claim 1,
b) a vulcanization package,
c) one or more filler(s),
d) one or more plasticizer(s) and
e) optionally, other rubber additives
to form a vulcanizable rubber mixture, wherein the mixture has a total compound loading of at least 250 phr, in particular at least 350 phr, preferably at least 450 phr and even more preferably of at least 550 phr, and
processing the mixture to form a shaped, moulded article; and
vulcanizing the shaped article.

* * * * *